United States Patent [19]

Beerens

[11] 4,435,999
[45] Mar. 13, 1984

[54] SAW SHARPENING GUIDE

[76] Inventor: Cornelis J. M. Beerens, 40-42 Berkshire Rd., North Sunshine, Victoria, Australia

[21] Appl. No.: 377,020

[22] Filed: May 11, 1982

[30] Foreign Application Priority Data

May 11, 1981 [AU] Australia .................. PE8799/81

[51] Int. Cl.³ .............................................. B23D 63/10
[52] U.S. Cl. ........................................ 76/36; 76/25 A
[58] Field of Search .................... 76/25 A, 36, 74, 37, 76/40, 41

[56] References Cited

U.S. PATENT DOCUMENTS 3,338,116 8/1967 McLean .................................. 76/36
4,131,038 12/1978 Beerens ............................. 76/25 A Primary Examiner—Roscoe V. Parker
Attorney, Agent, or Firm—Wigman & Cohen

[57] ABSTRACT

A sharpening guide for use with a chain saw comprising a support member adapted to rest upon the teeth of a chain in a straddling relationship thereto and having a dependent portion which will extend downwardly in a side by side relationship with the chain saw bar when the support member is in the straddling relationship. A locking member mounted on the support member for movement along a path inclined to the dependent portion so that it may engage the bar or chain of the saw and clamp it against the dependent portion of the support member in a wedging action. A pair of grooved rollers mounted on the support member so as to lie on opposite sides of the chain and of a diameter and disposition so that a file seated in the grooves thereof will be at the required inclination to sharpen teeth at the correct cutting angle.

9 Claims, 5 Drawing Figures

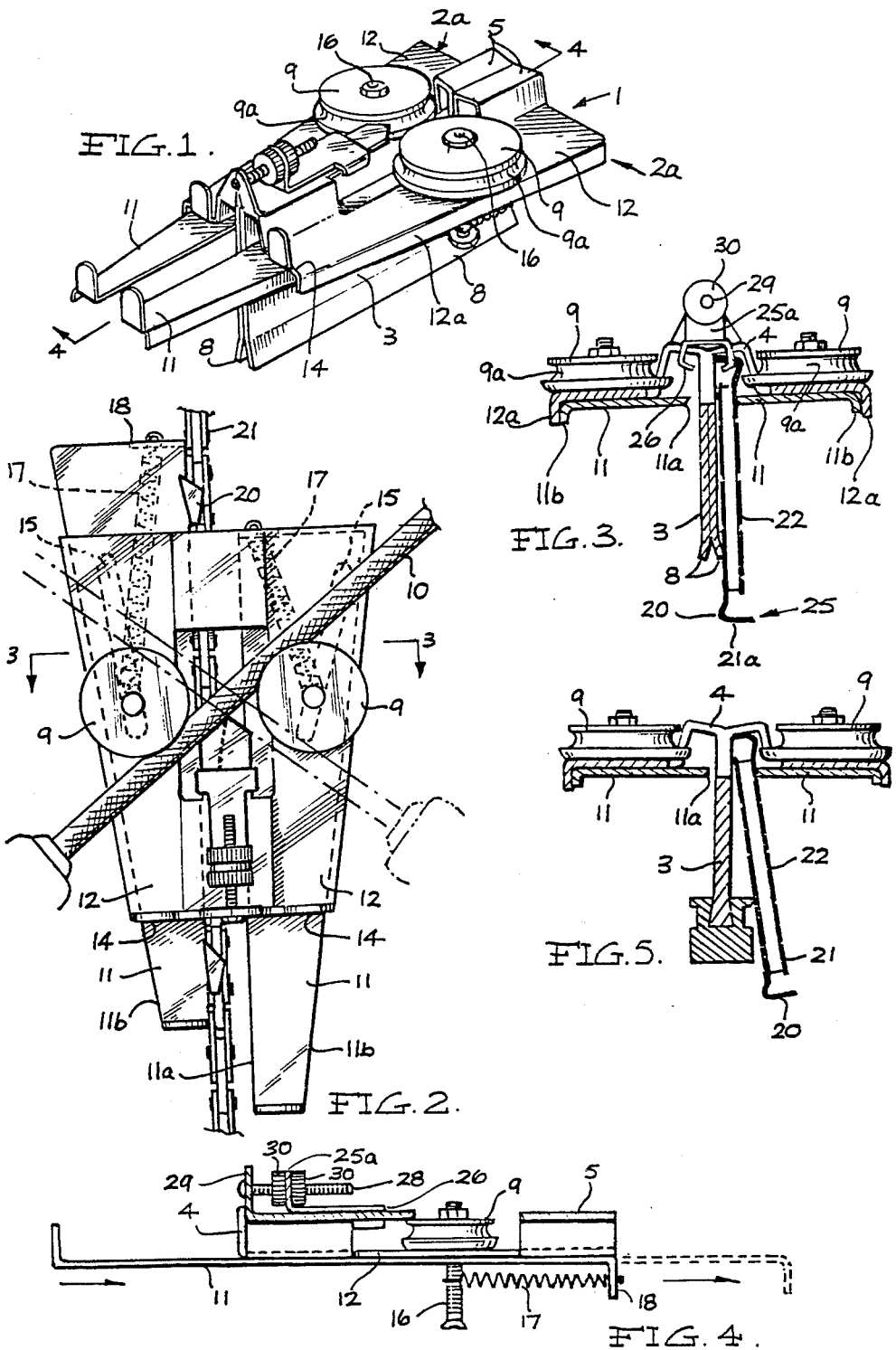

SAW SHARPENING GUIDE

BACKGROUND OF THE INVENTION

1. Field of the Invention

This invention relates to a guide for use in the sharpening of saws and in particular to the sharpening of chain saws.

2. Description of the Prior Art

There have previously been proposed a number of devices to guide a file whilst sharpening the teeth of a saw, and one particular type of such guide incorporates a pair of grooved rollers rotatably supported on a member which can be positioned in a straddling relationship across the toothed edge of the saw so that a roll is disposed on either side thereof. The rollers are of a size and disposition so that when a file is seated in the grooves of the rollers, so as to extend in an inclined relationship across the toothed edge of the saw, the file may be reciprocated to sharpen the cutting edge of the teeth of the saw at the required angle. One example of such a saw sharpening guide is disclosed in my U.S. Pat. No. 4,131,038.

BRIEF SUMMARY OF THE INVENTION

It is the object of the present invention to provide a guide for sharpening saws of the above referred to type which may be more simply and quickly located and locked in position on the saw than is possible with the currently known constructions.

With this object in view there is provided a saw sharpening guide including a member adapted to be located on the blade of the saw in a straddling relationship to the toothed edge and carrying two grooved rollers arranged to guide a file for the sharpening of the teeth of the saw; said member having a dependent portion arranged to engage one side of the blade when the member is in said straddling relationship thereto, a locking element supported by the member for sliding movement relative thereto along a path inclined to the plane of the saw blade so as to move towards or away from the blade when moved in respective opposite directions along said path, and resilient means urging said locking element to move along the path in the direction towards the saw blade whereby the blade may be gripped between the dependent portion and the locking element.

The locking element moving in a direction towards the saw blade along the inclined path acts in the manner of a wedge to firmly grip the saw blade so as to hold the support member in the desired straddling relationship to the toothed edge of the saw. Preferably there are provided two locking elements which move along respective inclined paths disposed on opposite sides of the dependent portion of the support member. The guide can thus be fitted to the saw with the dependent portion on either of the two opposite sides of the blade depending upon the inclination of the cutting edge of the tooth to be sharpened. It will be understood that alternate teeth on a saw have respective cutting edges that are oppositely inclined to the plane of the blade and accordingly are sharpened from opposite sides of the blade.

When the sharpening guide is to be used in conjunction with a chain saw it is preferable that the locking element and dependent portion co-operate with the opposite sides of the chain so that it is gripped therebetween. However it is also desirable that a part of the dependent portion of the member is also in contact with the bar carrying the chain so as to provide the required steadying or stabilizing effect on the guide during the sharpening operation.

Preferably the support member includes one or more U-shaped portions which receive the toothed end of the blade therein so that the base of the U rests on the tips of the teeth. The resting of the support member on the tips of the teeth in this manner ensures that the rollers are disposed at the required height relative to the teeth to be sharpened, so that a file seated in the grooves of the rollers is in the correct height relationship to the cutting edge of the teeth to be sharpened.

In addition an adjustable stop may be provided on the support member to co-operate with an appropriate part of the tooth, other than that to be sharpened, so that during the sharpening operation each tooth will be sharpened to an extent so that a uniform pitch will be maintained between the teeth. This adjustable stop may be in the form of a slide mounted on the support member to engage the back edge of the tooth being sharpened with an adjusting screw arranged to move the slide along the support member in the direction of the length of the blade.

Preferably the rollers are mounted with their grooves in a common horizontal plane which will extend transverse to the toothed edge of the saw when the support member is in the straddling relation thereon. The diameter of the rollers and the distance between their axes is selected so that when a file is seated in the grooves on the two rollers, so as to extend in either of the two diagonal directions between the two rollers, the file will be moving in a line corresponding to the angle of the cutting edge of the teeth to be sharpened. By arranging the rollers so that the inclination of the line of the file to the plane of the bar is equal and opposite in the two alternative dispositions, then the alternate teeth of the saw can be sharpened by merely re-locating the guide on the saw bar and positioning the file in the appropriate one of the two opposite diagonal positions it may occupy when seated in the grooves of the two rollers.

Conveniently the locking element is of a wedge shape and is mounted on the support member in a plane transverse to the bar of the saw when fitted thereto. The locking element has one edge parallel to the plane of the bar and the opposite edge inclined thereto. The inclined edge is seated in a track formed in the support member to define the inclined path. A spring is connected between the locking element and the support member to urge the locking element to move along the inclined path in a direction to move the parallel edge toward the dependent portion of the support member. Accordingly when the support member is positioned in the straddling relationship on the bar and the locking element released, the bar or chain is automatically gripped between the dependent portion of the support member and the locking element by the wedging action induced by the spring.

BRIEF DESCRIPTION OF THE DRAWINGS

FIG. 1 represents a perspective view of the saw sharpening guide of the invention;

FIG. 2 represents a plan view of the guide positioned on a chain saw with a file in position;

FIG. 3 represents a sectional view of the guide along line 3—3 in FIG. 2;

FIG. 4 represents a sectional elevational view of the guide taken along line 4—4 in FIG. 1; and FIG. 5 represents a view similar to FIG. 3 with a modification of the guide.

DETAILED DESCRIPTION OF THE PREFERRED EMBODIMENT

Referring now to the drawings the sharpening guide 1 illustrated is for use in sharpening the teeth 20 of a chain 21 of a chain saw, when the chain is filled to the bar 22 of the chain saw. The main support member 2 of the guide comprises two pressed metal components 2a, one being a mirror image of the other, secured together in a back to back relation such as by spot welding.

Each of the components 2a comprises a dependent portion 3, with an outwardly turned lower lip edge 8, and two inverted U-shaped portions 4 and 5 at the upper edge. Each component 2a also includes a flange portion 12 integral with the portions 4 and 5 and extending in a direction at right angles to the dependent portion 3. The terminal edge 12a of each flange portion 12 has a turned down lip, and is inclined to the dependent portion 3, with the terminal edges being equal and oppositely inclined.

In a conventional chain saw the width of the cutting edge 21a of each tooth is greater than the thickness of the bar 22 so that the bar has clearance in the cut made by the chain. This relationship can be clearly seen at 25 in FIG. 3. The extent of outward turn of the lip edge 8 of each dependent portions 3 is substantially equal to the extent that the cutting edge 21a of the tooth projects beyond the bar 22. Accordingly, when the sharpening guide is fitted to a conventional chain saw the dependent portion 3 is substantially parallel to the bar 22 of the saw.

A locking member 11 is located beneath each flange portion 12, having an inner edge 11a parallel to the plane of the dependent portion 3 and on outer edge 11b parallel to and engaging the terminal edge lip 12a of the associated flange portion 12. The locking members 11 are mounted in sliding relation with the associated flange portion 12 by the nut and bolt unit 16, which is attached to flange portion 12 and extend through a slot 15 in the locking member. The slot 15 extends in a direction parallel to the inclined outer edge 11b of the locking member 11 and lip 12a of the flange portion so that the locking member may slide relative to the flange portion 12 in the direction parallel to the lip 12a of the flange portion.

Sliding movement of the locking member 11 relative to the flange portion 12, toward the narrow end 14 of the flange portion, cause the inner edge 11a to move closer to the dependent portion 3 of the support member, and movement of the locking member 11 in the opposite direction moves the inner edge 11a away from the dependent portion. Each locking member is provided with a lug 18 and a tension spring 17 is connected between the lug 18 and the nut and bolt unit 16 to urge the locking member to move towards the narrow end 14 of the flange portion 12 and hence move the inner edge 11a of the locking member towards the dependent portion 3.

As can be seen in FIG. 3 when the sharpening guide is positioned on a conventional chain saw, the lower lip edge 8 on the right hand side of the dependent portion 3 engages the left hand side of the saw bar 22, and the cutting teeth 20 on the chain on the upper side of the bar 22 engage the right hand side of the dependent portion 3. The right hand locking member 11 engages the right hand side of the bar 22 and press the bar 22 and cutting teeth 20 adjacent the dependent portion 3.

The inclination of the terminal edge 12a of the flange portion 12 and of the outer edge 11b by locking member, and the width of the locking member are selected, so that when the sharpening guide is fitted to a conventional chain saw bar 22 as shown in FIG. 3, the spring 17 connected to the locking member that is in engagement with the bar 22 is tensioned. The force created by this tensioned state of the spring results in the locking member 11 acting as a wedge between the bar 22 and the terminal edge 12a of the flange portion 12. The sharpening guide is thus locked in position on the chain saw bar.

It will be understood that the bar of the saw will be clamped to the left hand side of the dependent portion 3 when it is desired to sharpen cutting teeth 20 have a cutting edge inclined as in FIG. 2, and is clamped to the right hand side when the cutting edge of the tooth being sharpened is inclined in the opposite direction.

Usually the cutting edge of chain saw teeth is inclined at 30° or 35° to the plane transverse to the direction of travel of the chain, and accordingly a file used to sharpen the teeth must be guide to move in that direction. This may be achieved by mounting a roller 9 on each flange portion 12, each roller having a grooved peripheral surface 9a to provide a seat for a conventional round file 10. The rollers are mounted for rotation in a common horizontal plane at right angles to the plane of the dependent portion 3. In the embodiment illustrated the rollers are rotatably mounted on the bolt and nut units 16 which attach the locking members 11 to the flange portions 12.

The diameter of the rollers at the base of the grooves, and the distance between the axis of the rollers is selected so that, when a round file of the correct diameter is seated in the grooves it is inclined at the correct angle to sharpen the cutting edge of the teeth of the chain. One pair of rollers will of course be suitable for sharpening only teeth of one inclination and if the guide is to be used for sharpening teeth of differing inclinations then separate sets of rollers for each inclination is required. The rollers may be detachably mounted so that the pairs of rollers may be readily changed if required.

Also the height of the teeth vary, as heavy duty chain saws use larger teeth than chain saws for domestic or hobby use. With the bigger teeth a larger diameter file is used, and the height of the axis of the file may be required to be varied. Suitable alternative roller can be produced to fitment to the guide when such chain saws are being sharpened.

As can be seen in FIG. 3 when the guide is fitted to a chain saw bar the top of the cutting teeth of the chain on either side of the tooth to be sharpened engage the base of the U-shaped portions 4 and 5 of the support member 2. The height of the file 10 seated in the grooved rollers relative to the tooth to be sharpened is thus set by the engagement of the other teeth of the chain with the base of the U-shaped portions.

The adjustable stop 25 is slidably mounted on the extension 26 of the U-shaped portion 4. The position of the stop is controlled by the threaded member 28 attached to the lug 29 on the portion 24, and the nuts 30. The threaded member 28 extends through an aperture in the lug 25a on the adjustable stop, with one nut 30 on either side of the lug 25a. The portion 25b of the adjustable stop located beneath the extension 26 will be engaged by the rear of the tooth to be sharpened and set the position of the cutting edge of that tooth relative to the file seated in the grooved rollers.

Once the stop 25 has been set, and all the teeth of the chain are sharpened with the same setting of the stop, a uniform pitch between the teeth will be maintained.

Some chain saws have cutting teeth in which the cutting edge is inclined in the transverse direction across the plane of the bar. Usually the transverse inclination is 10°. Accordingly, to correctly sharpen such teeth the plane in which the rollers rotate must also be inclined at 10° to the bar. The present guide can readily be modified to sharpen the teeth of such chains by increasing the effective width of the lower end of the dependent portion 3. As shown in FIG. 5 a space bar 30 having a dovetail shaped groove 31 to slidably receive the lips 8 at the lower end of the dependent portion 3, is assembled to the support member 2. The legs 32 projecting from opposite sides of the spacer bar are of a width selected so that the dependent portion 3 will be inclined at 10° to the bar 22 when the guide is fitted to a chain saw as previously described. Thus the common plane in which the rollers 9 rotate is similarly inclined at 10° to the plane of the bar 22. It will be appreciated that when the guide is fitted to a chain saw bar with the dependent portion 3 on the opposite side of the bar to that shown in FIG. 5 the plane of the rollers 9 will be oppositely inclined.

I claim:

1. A saw sharpening guide including a member adapted to be located on the blade of the saw in a straddling relationship to the toothed edge and carrying two grooved rollers arranged to guide a file for the sharpening of the teeth of the saw; said member having a dependent portion arranged to engage one side of the blade when the member is in said straddling relationship thereto, a locking element supported by the member for sliding movement relative thereto along a path inclined to the plane of the saw blade so as to move towards or away from the blade when moved in respective opposite directions along said path, and resilient means urging said locking element to move along the path in the direction towards the saw blade whereby the blade may be gripped between the dependent portion and the locking element.

2. A saw sharpening guide as claimed in claim 1 wherein the two grooved rollers are mounted on the member to rotate in a common plane transverse to the plane of the saw blade with one grooved roller on each side of the saw blade, said rollers being of a diameter and with the axis thereof spaced so that a file seated in the grooves of the two rollers and extending diagonally between the rollers in either of two positions of equal and opposite inclination to the saw blade corresponding to the angle of the cutting edge of the teeth of the saw.

3. A saw sharpening guide as claimed in claims 1 or 2 wherein the member includes a portion adapted to rest upon the tips of the teeth of the saw when the member is in said straddling relation so that the common plane of rotation of the rollers is a predetermined distance below the tips of the teeth.

4. A sharpening guide for use in sharpening the teeth of a chain of a chain saw mounted on a chain saw bar said guide comprising a support member adapted to rest upon the teeth of the chain to support the member in a straddling relation to the chain, a member dependent from the support member and adapted to lie beside the chain saw bar when the support member is in said straddling relation, a locking member mounted on the support member for sliding movement relative thereto along a path inclined to the dependent member so that movement of the locking member along said path towards the dependent member will clamp the chain saw bar between the locking member and the dependent member, and resilient means urging said locking member to move towards the dependent member.

5. A sharpening guide as claimed in claim 4 wherein there are two locking member, each mounted on the support member on opposite sides of the dependent member, each locking member being mounted for sliding movement relative to the support member along respective paths oppositely inclined to the dependent member.

6. A sharpening guide as claimed in claim 5 wherein the two grooved rollers are mounted on the member to rotate in a common plane transverse to the plane of the saw bar with one grooved roller on each side of the saw bar, said rollers being of a diameter and with the axis thereof spaced so that a file seated in the grooves of the two rollers and extending diagonally between the rollers in either of two positions of equal and opposite inclination to the saw bar corresponding to the angle of the cutting edge of the teeth of the saw, the chain saw bar being clamped between the dependent member and the respective locking member during sharpening of alternate teeth with oppositely inclined cutting edges.

7. A sharpening guide as claimed in claim 6 including a detachable spacer on the lower end of the dependent member whereby when the spacer is attached the dependent member will be inclined to the chain saw bar at a predetermined angle when the guide is clamped thereto, and when the spacer is detached the dependent member is substantially parallel to the chain saw bar.

8. A sharpening guide as claimed in claim 5 wherein portion of the support member is adapted to rest upon the tops of the teeth of the chain when the support member is in the straddling position, said portion being located so that the file seated in the grooved rollers is at the required height relative to the tooth to be sharpened for correct sharpening of the cutting edge of that tooth.

9. A sharpening guide as claimed in claim 5 including an adjustable stop member mounted on the support member and adapted to engage the rear face of the tooth to be sharpened when the support member is in said straddling position, and means are provided to vary the position of the stop member in the direction of the length of the chain relative to the rollers to maintain a uniform pitch of the cutting teeth of the chain.

* * * * *